J. V. A. Wemple.

Self-Raking Harvester.

No. 2,931. Reissued May 12, 1868.

Witnesses.

Geo. Patten

Jas. B. Clay

Inventor.

Jacob V. A. Wemple

N. PETERS, PHOTO-LITHOGRAPHER, WASHINGTON, D. C.

United States Patent Office.

JACOB V. A. WEMPLE, OF QUINCY, MICHIGAN.

*Letters Patent No.* 23,730, *dated April* 19, 1859; *reissue No.* 2,931, *dated May* 12, 1868.

IMPROVEMENT IN HARVESTERS.

The Schedule referred to in these Letters Patent and making part of the same.

TO ALL WHOM IT MAY CONCERN:

Be it known that I, JACOB V. A. WEMPLE, formerly of Chicago, Illinois, now of Quincy, in the State of Michigan, have invented a new and useful Improvement in Harvesters; and I do declare that the following is a full, clear, and exact description of the same, reference being had to the accompanying drawing, making a part of this specification, in which—

Figure 3:
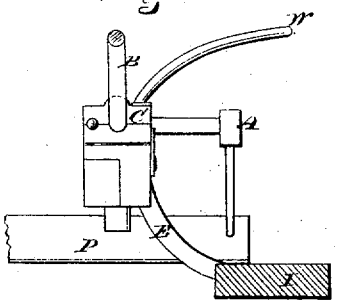
Figure 1:
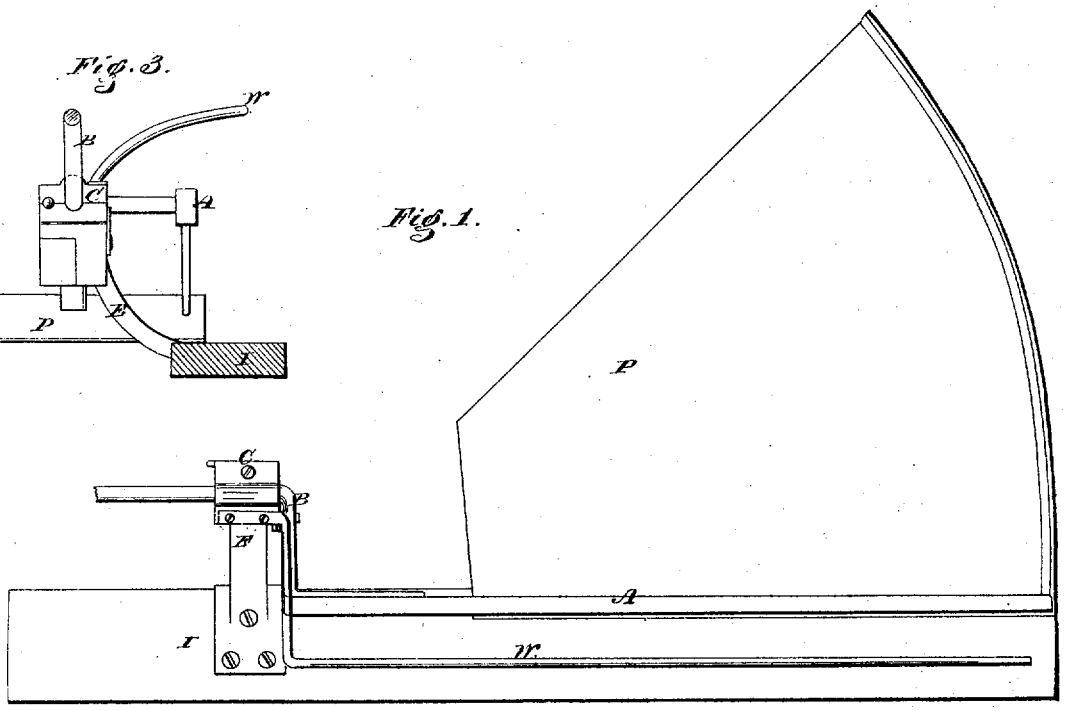
Figure 2:
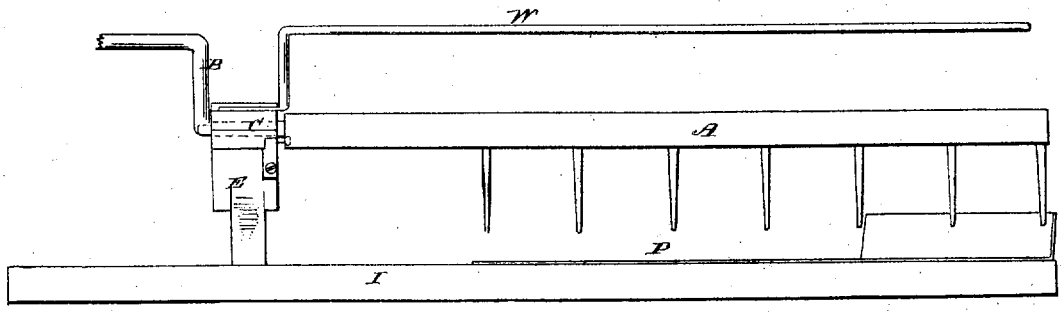

Figure 1 is a plan view,

Figure 2 a front view,

Figure 3 an end view.

The nature and object of my invention consist in providing a harvester with a new and improved device for separating the falling grain from that which is to be discharged from the platform, so that the former shall not become entangled or intermingled with the latter while being discharged. I accomplish this by means of a rod or bar, so placed and operated that when a sufficient amount of cut grain has accumulated on the platform to form a gavel, the rod will be interposed to receive and hold the falling grain until the completed gavel on the platform is sufficiently removed to prevent the falling grain from becoming intermingled and drawn off therewith, when, the separating-rod or finger being withdrawn, the cut grain accumulated thereon is allowed to fall and rest upon the platform, together with the falling grain, until another gavel has accumulated, and the operation is repeated as before.

In the drawings, A represents a rake, which is shown in connection with my device or attachment; P, a platform; I, a finger-bar; E, a standard; C, a swivel or pivotal attachment to the standard; and B a crank or operating-rod. The standard or post E is located at the inside of the platform; its precise location will, however, depend upon the kind of harvester with which my device is to be used. The separating-rod or finger, W, is attached to or connected with the standard E by means of a pivotal attachment, C, and is located at a proper distance above the platform to receive the upper end of the cut grain, while the lower end of the grain rests upon the cutter-bar or platform, and also at such a distance in rear of the cutter-bar that it will receive the grain at a proper angle to be held. When a sufficient quantity of grain has accumulated upon the platform to form a gavel or bundle, the bar or finger W is vibrated or moved forward upon its pivotal support until it is interposed between the completed gavel on the platform and the falling grain, and serves to arrest and hold the latter until the completed gavel on the platform is sufficiently removed to prevent the falling grain, together with that resting on the finger, from becoming entangled and drawn off with it, when the separating-rod or finger being withdrawn or moved back, the grain accumulated thereon is allowed to fall upon the platform, and to remain until a sufficient quantity has accumulated to form another sheaf, and the operation is repeated as before.

The rod or arm B, by means of which the separating-rod or finger W is vibrated, is connected with the main part of the harvester by any suitable means. One method of so connecting this rod B will be found described in a patent issued by the United States to myself and A. Wemple, February 16, 1858.

Having thus fully described my invention, what I claim as new, and desire to secure by Letters Patent, is—

1. A separating-rod or finger, W, automatically interposed, for separating the falling grain from that which is being discharged from the platform.

2. The rod or finger W, pivotal piece C, and standard E, in combination with the rod B, constructed and operating substantially as specified.

3. A movable separating-rod or finger, for separating the falling grain from the completed gavel on the platform, in combination with a single supporting-standard or post, located at the inner end, or inner front corner of said platform, substantially as described.

JACOB V. A. WEMPLE.

Witnesses:

JAMES GILLESPIE,

E. H. WEMPLE.